Oct. 28, 1958     O. B. HOPKINS     2,857,970
MAGNETIC FISHING TOOL

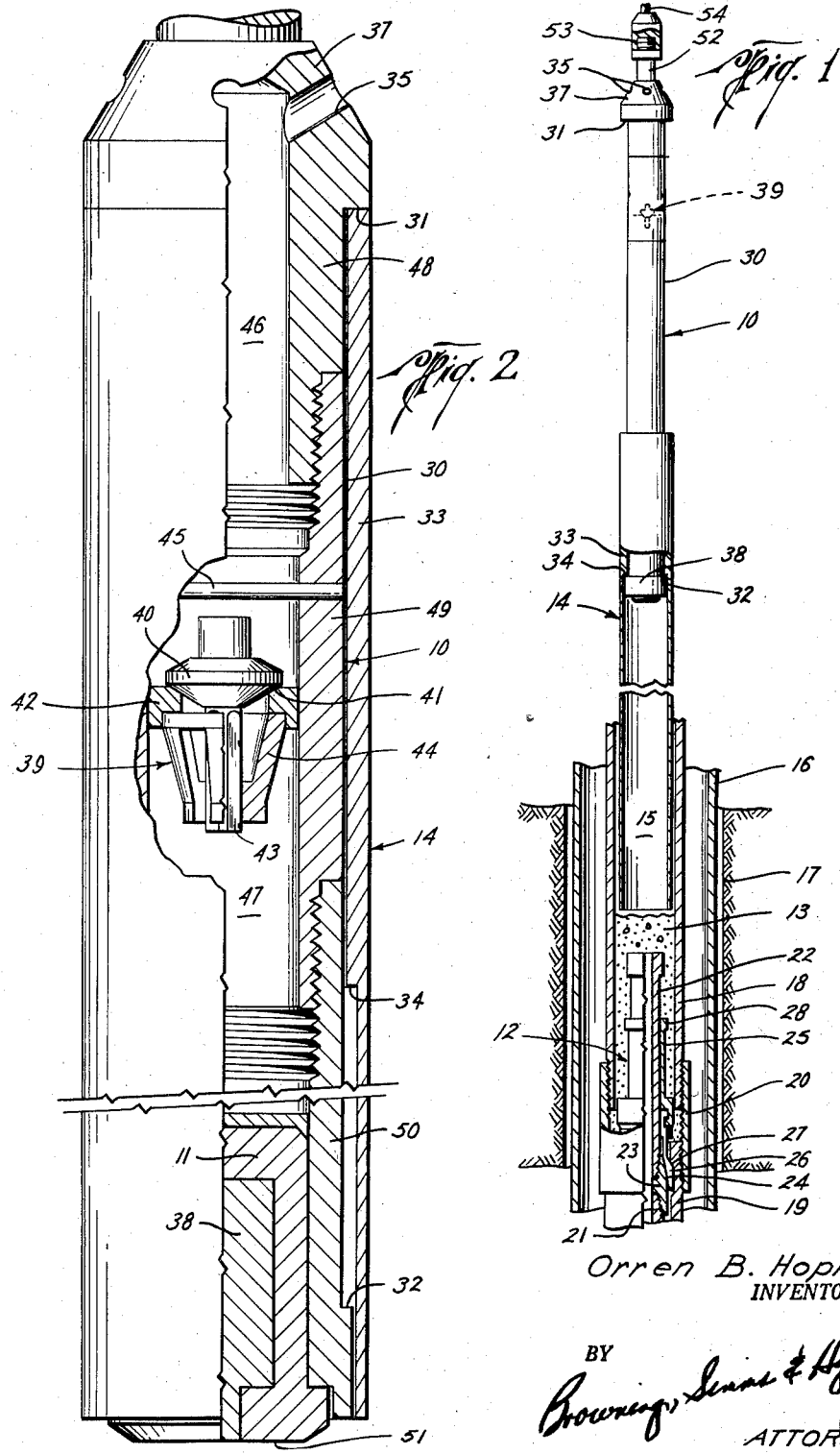

Filed July 2, 1954     2 Sheets-Sheet 2

Orren B. Hopkins
INVENTOR.

BY Browning, Simms & Hyer
ATTORNEYS

United States Patent Office 2,857,970
Patented Oct. 28, 1958

2,857,970

MAGNETIC FISHING TOOL

Orren B. Hopkins, Lafayette, La.

Application July 2, 1954, Serial No. 441,038

4 Claims. (Cl. 166—65)

This invention relates broadly to a tool for use in removing from a well objects that are lodged therein, such objects being termed 'fish" by the industry. In one of its aspects, it relates to a tool particularly adaptable for removing fish covered over with sand or other well debris, which would normally prevent their being engaged by a fishing tool, by providing an improved fluid agitating means for uncovering the fish to facilitate their removal. In another of its aspects, this invention relates to an improved magnetic type fishing tool. A further aspect is the provision of this class of tool which lends itself to wire line operations.

It is often found that various objects used in the drilling or production of wells will become stuck within the well bore, casing or tubing and thereby interfere with normal operations. For example, a portion of the drilling or producing equipment may be broken off and lodged within the well bore or well pipe. Also, any one of a variety of tools disposable at preset locations within the tubing for establishing certain flow conditions within the well require positive displacement from their preset position. In this sense then, a "fish" may be any object either accidentally or purposely lodged or stuck within a well and requiring the use of a fishing tool for displacement therefrom and subsequent removal from within the well.

It is conventional practice to lower fishing tools into the well for picking up and removing the fish therefrom. In this practice, it has been attempted to suspend fishing tools from a wire line and cause their movement vertically within the well from suitable control mechanism at ground level. These tools employ magnetic or other suitable means for engaging and picking up the fish and have proven successful where the fish is so disposed in the well as to be easily engaged by the pickup means.

Particular problems are encountered, however, when the fish is covered with sand and other sediments which make it inaccessible. For this purpose, it has been proposed to provide magnetic fishing tools with means for flushing the settled material from above the fish and thereby exposing it for engagement by the tool by agitating the well fluid in the vicinity thereof. However, due to the complex nature of such fluid agitating means, these tools have not lent themselves to operation in installations having only a suspension connection with the ground level as, for example, a sucker rod or, preferably, a single wire line.

It is an object of this invention to provide a fishing tool for removing fish from a well which are covered with sediment or the like, wherein the tool may be operated by a suspension connection with the ground level for reciprocation to actuate self contained means for agitating the well fluid itself in the vicinity of the fish and thereby uncover the same.

It is another object to provide a fishing tool for removing fish from a well which are covered with sediment or the like, wherein the tool may be operated by a single wire line.

Another object is to provide a fishing tool having relatively moving parts operable upon reciprocation of a single wire line to create a zone of agitation in the well fluid above the fish.

Still another object is to provide fluid agitating means for use with a magnetic fishing tool, which means is constructed of a minimum of parts and operable in a simplified manner.

Still another object is to provide a magnetic fishing tool in which fish or other objects held by the magnet are protected against displacement therefrom during withdrawal of the tool from a well.

Other objects and advantages of this invention will appear as the description proceeds.

In the accompanying drawings forming a part of the instant specification and wherein like reference numerals are used in the various views to indicate like parts:

Fig. 1 is a view partly in section of a fishing tool illustrative of the present invention and disposed within a well tubing in position above fish lodged within the tubing;

Fig. 2 is an enlarged detailed view of the tool of Fig. 1 with one side thereof in section and the other side broken away in part;

Figure 4:
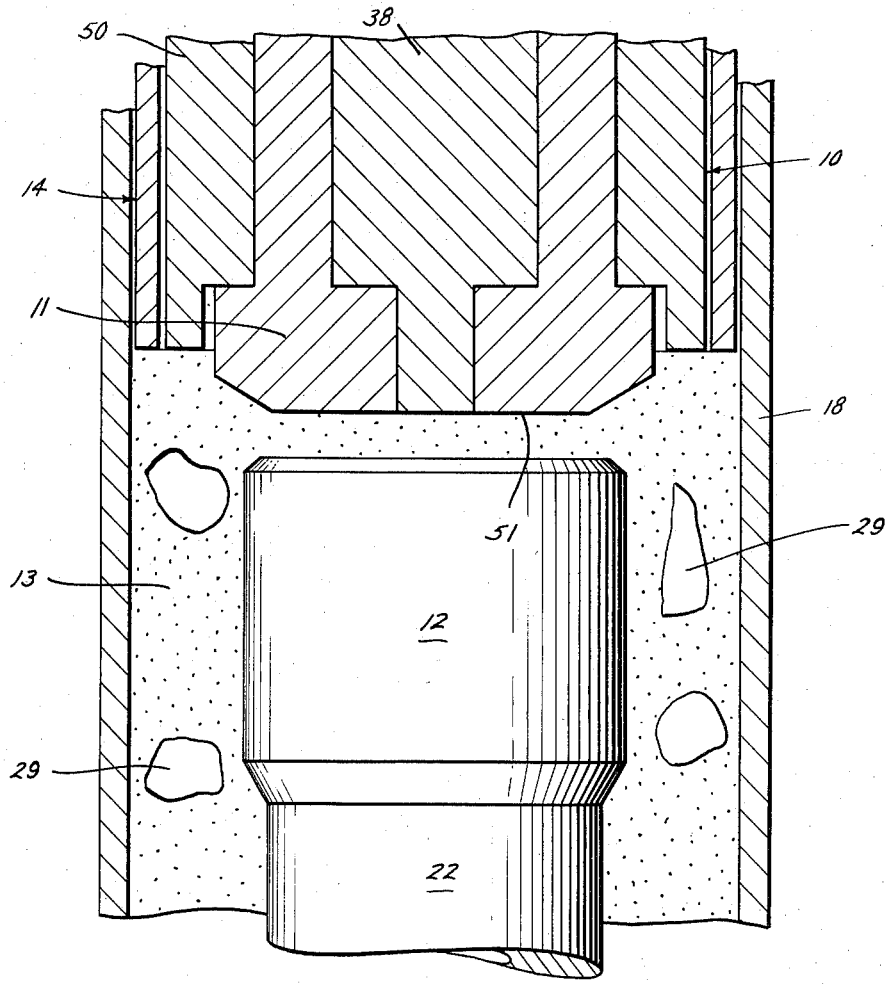
Fig. 4 is a still further enlarged view of the lower end of the tool in operative position within the well tubing above the fish.

The improved fishing tool of the present invention comprises a body 10 adapted to be suspended as by a wire line for vertical movement within a well and carrying a magnet 11 in position for use in removing fish, such as the tool 12 or metal fragments 29, from within the well when lowered into position thereover. Means are provided at the lower end of the body for agitating the well fluid in the vicinity of the tool upon reciprocation of the wire line, whereby sediment 13 in the form of sand or the like above the fish may be flushed away to uncover the same and permit it to be fished from the well. This fluid agitating means comprises a sleeve 14 received around the body 10 and relatively movable with respect thereto such that reciprocation of the suspended body vertically within the well causes expansion and contraction of a zone or chamber 15 (Fig. 1) defined by the body and sleeve above the fish.

Referring now specifically to Fig. 1, there is shown a well casing 16 disposed within a well bore 17 and surrounding in annular spaced relation a well tubing 18. Each of the above is shown only in part, but it will be understood to those skilled in the art that the casing and tubing extend from ground level to the bottom of the hole. It will also be understood that suitable winch mechanism may be provided a ground level for raising and lowering the fishing tool by a wire line for the purposes described.

The fish 12 shown within the tubing 18 is a part of a conventional type tool used in controlling flow conditions within the well, which tool may, for example, be a removable side-door choke assembly of a type manufactured by Otis Pressure Control, Inc., and shown and described in detail on page 2 of the 1953–54 edition of said manufacturer's catalogue. It is sufficient to note, however, that the assembly includes a landing nipple 19, which is installed as a part of the tubing 18 by means of a collar 20, and a packing mandrel 21 which is locked or lodged within the nipple or tubing in a manner described below.

A carrier mandrel 22 is connected to the packing mandrel 21 by a locking mandrel 23 which has a conical expander surface 24. A dog carrier 25 is slidably received over the carrier mandrel and carries dogs 26 which slide over surface 24 into latching position under a shoulder 27 formed internally of the landing nipple 19. Thus, in the position shown in Fig. 1, the fish 12 is removably lodged within the tubing.

A special pulling tool may be used in releasing the fish 12 from its locked position and removing the same from the tubing. Such a tool is shown and described on page 22 of the aforementioned catalogue and includes dogs which are adapted to latch under a pulling flange 28 on the dog carrier 25 when the pulling tool is lowered into the tubing. With the dogs so latched, an impact may be transmitted through the carrier mandrel 22 to the locking mandrel 23 so as to lower the expander surface 24 and thus release the dogs 26 from the shoulder 27. At this time, a pull upwardly on the pulling tool moves the dogs upwardly along said surface to fully retract the same and permit pulling of the fish 12 out of the tubing.

It will be understood, however, that the sediment 13 which has settled out of the well fluid and accumulated above the fish must be removed from the vicinity thereof in order that the pulling tool dogs may grasp the flange 28 and pick up the fish. As well, it is often found that metal fragments 29 from drill bits or the like are lodged under the sediment and above the tool and thus constitute another variety of "fish" to be removed from the well. These fragments or fish 29 may be picked up by the magnet 11 of the fishing tool so that, viewing the over-all operation involved in removing the fish 12 from within the tubing, the body 10 is lowered within the tubing and into position above the fish 12 whereby reciprocation of the body will agitate well fluid above the sediment 13 and thereby uncover fish 29 and the flange 28. In this same process, of course, the fish 29 are picked up by the magnet 11. Upon completion of this operation, the fishing tool of the present invention may be removed from the tubing and the pulling tool employed in the same manner described to release and remove the fish 12.

The assembly formed by the body 10 and sleeve 14 is cylindrical to permit its free movement vertically within the tubing. Preferably, the diameter of the assembly is uniform throughout its length and closely approximates that of the inner diameter of the tubing to substantially obstruct the same such that the zone 15 (Fig. 1) above the fish 12 substantially covers the top of the sediment 13. As well, the inner diameter of the sleeve is larger than that of the fish 12 so that during operation of the tool, the sleeve may be gradually lowered with clearance around the upper end of said fish.

The body 10 is tubular to provide a passage for fluid flow between the upper and lower ends thereof. More particularly, and as will be described hereinafter, the passage through the body is restricted whereby a pumping effect is created in the zone or chamber 15 upon reciprocation of the body relative to the sleeve 14.

As best shown in Fig. 2, the body is provided with an annular recess 30 around which the sleeve 14 is received to form the cylindrical assembly of uniform diameter previously mentioned. The sleeve is mounted upon the recess with sufficient clearance to permit free sliding movement longitudinally relative thereto between limits defined by upper and lower shoulders 31 and 32 formed on the body at opposite ends of the recess. The sleeve is also of sufficient size and weight such that its natural tendency while disposed within the well is to slide to its lower limit. In this manner, of course, relative movement between the sleeve and body is produced by controlled reciprocation of the body within the limits prescribed.

The sleeve 14 is provided with an enlarged upper end portion 33 to form an internal abutment 34 adapted to seat upon shoulder 32 of the body 10 in the lower limit position of the sleeve and body relative to one another. In the upper limit position, the upper end of enlarged portion 33 abuts against shoulder 31. As will be understood from the drawings, the maximum extent of reciprocation of the body and sleeve relative to one another is governed by the relative lengths of the recess 30 and enlarged portion 33.

The lower portion of the sleeve is extended, as best shown in Fig. 1, so that its lowermost end depends substantially below the lower end of the body 10 in the lower limit position of the tool. This extended portion of the sleeve, when lowered into position above the fish 12, forms with the body 10 the substantially enclosed chamber or zone 15. In this sense, the term "substantially enclosed" is used inasmuch as at least in one operation of the tool, restricted fluid flow is permitted through the passage through the body. As well, there will be some openings out of the space below the lower end of the sleeve where the sleeve rests upon the sediment 13 such that there may be a certain amount of fluid flow out of the space and up the outside of the tool.

It should be noted that in its extending position below the lower end of the body, the sleeve 14 not only defines the chamber 15 but also serves to shield fish 29 picked up by the magnet 11 from being displaced if dragged against tubing or coupling recesses during withdrawal of the tool from the tubing.

In the preferred form of the tool, the lowermost end of the sleeve in its upper limited position relative to the body is substantially flush with the lower end of the body. Although this arrangement need not necessarily be the case, it is preferable in that it provides a maximum breadth of expansion and contraction of the chamber 15 with a minimum requirement of body reciprocation.

As previously mentioned, fluid passage through the body 10 is restricted to provide a pumping effect within the zone 15 upon reciprocation of the body. According to a broader aspect of this invention, this flow restriction may comprise one or both series of restricted openings or ports 35 and 36 (Fig. 3) through the laterally disposed upper and lower members 37 and 38, respectively, each of which extends across the inner diameter of the tubular body. The upper member 37 forms a head for the body, while the lower member 38 supports the magnet 11 in a manner to be described. With passage thus restricted through the body, it will be understood that upon relatively rapid reciprocation of the body relative to the sleeve, a pumping effect will be produced in the alternately expanded and contracted chamber 15 whereby the well fluid above the sediment 13 is agitated and the sediment itself flushed away from its covering position above the fish 12 and fish 29.

However, in accordance with a still further novel concept of this invention, the passage through the body is provided with a valve means 39 which is operable during contraction of the chamber 15, or movement of the sleeve and body relative to one another to the upper limit, to permit fluid flow through the passage and operable during expansion of the space, or movement to the lower limit, to prevent fluid flow therethrough. In this manner, the efficiency of the pumping effect is enhanced by the provision of a more fully enclosed chamber or zone during what might be called the suction stroke of the tool and a controlled pressure relief opening for the space during the pressure stroke.

The valve means 39 is preferably disposed intermediate the upper and lower flow restricting members 37 and 38 and comprises a conically shaped valve element 40 adapted to be seated upon a valve seat 41 on the upper side of a laterally extending member 42 such that increased pressure within the chamber 15 will tend to lift the valve element from its seat while a decrease in pressure therein will tend to hold the valve element in the seated position of Fig. 2. The valve element is provided with a stem 43 which is guided within a spider 44 secured to the lower side of the member 42. A pin 45 extending across the body above the valve element limits the movement of the element and prevents escape of the stem from the spider.

The passage through the tubular body is thus divided by the valve means 39 into upper and lower chambers 46 and 47. In operation, both chambers serve to at least temporarily trap some of the sediment 13 which is flushed within the chamber 15. That is, it may be found that some of this sediment will escape through the openings 36 into the chamber 47 upon reciprocation of the tool and the upper side of the member 38 provides a surface for containing this sediment. A perhaps lesser amount of sediment may escape further through the valve means 39 and into the upper chamber 46.

In its preferred form, the body 10 is made up of an upper sub 48, a valve sub 49, and a magnet sub 50, each of which is threadedly connected together to facilitate replacement of parts, particularly the valve means 39.

Figure 3:
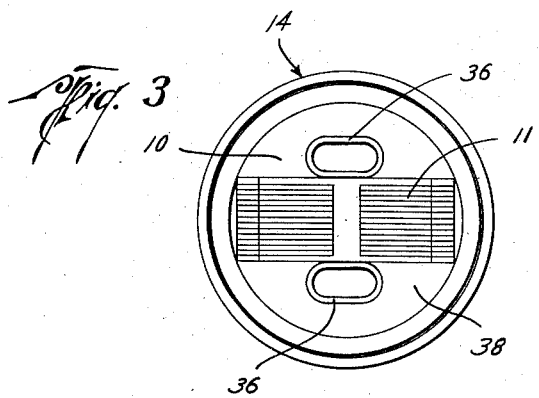
Fig. 3 is a lower end view of the tool as shown in Fig. 2.

As previously mentioned, the magnet 11, which is a permanent type and consists of any material suitable for this purpose, is supported by the member 38 in position to pick up fish such as the metal fragments 29. More particularly, the member 38 forms a sheath for the magnet, the relatively large end face 51 of which projects slightly below the lower end of sub 50. As shown in Fig. 3, the openings 36 are disposed at opposite sides of the magnet.

As shown in Fig. 1, a neck portion 52 above the upper member 37 of the body 10 is threaded to provide a fitting for receiving a coupling 53 secured to the end of a wire line 54. In this manner, the body may be reciprocated as desired to create agitation of the well fluid for the purposes described.

It will be understood that the above-described illustrative embodiment of the present invention accomplishes the objects set forth and is productive of many additional advantages apparent to those skilled in the art. That is, this fishing tool provides means operable by a wire line or the like for uncovering fish from beneath sediment and the like in the well whereby the fish may be picked up by the tool itself or other suitable means. The uncovering of the fish is readily accomplished by well fluid agitating means which is self contained and constructed of a minimum of parts.

It will be understood that certain features and sub-combinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A tool for use in removing fish from a well comprising, a body adapted to be moved vertically within a well, a sleeve carried by and around the body, said body being reciprocable longitudinally of the sleeve between upper and lower limits, the lower limit of reciprocation being arranged to dispose the lower end of the body substantially flush with the lower end of the sleeve, and the upper limit of reciprocation being arranged to dispose said lower end of the body a substantial distance above said lower end of the sleeve, a passage through the body communicating the upper and lower ends of the body, valve means in said passage for preventing fluid flow therethrough upon reciprocation of said body toward its upper limit and for permitting such flow upon reciprocation of said body toward its lower limit, and a magnet on the lower end of the body for attracting fish within the well.

2. A tool of the character defined in claim 1, said body being substantially tubular and having a member extending across its lower end to support the magnet and define a chamber thereabove, and said passage including a restricted opening through the member communicating with said chamber.

3. A tool for use in removing fish from a well comprising, a body adapted to be lowered within a well into the vicinity of the fish, a sleeve carried by the body and disposable to define with the lower end of said body a substantially enclosed chamber above the fish, means providing for relative movement between said body and sleeve to selectively expand and contract said chamber whereby well fluid above said fish is agitated, a permanent type magnet carried on the lower end of the body in position to attract said fish, a passage through the body providing for fluid flow between the lower and upper ends of the body for communicating with said chamber, and valve means in said passage operable during contraction of said chamber to permit fluid flow through the passage but preventing fluid flow therethrough during expansion of the chamber.

4. A tool for use in removing fish from a well comprising, a body adapted to be lowered within a well into the vicinity of the fish, a sleeve carried by the body and disposable to define with the lower end of said body a substantially enclosed chamber above the fish, means providing for relative movement between said body and sleeve to selectively expand and contract said chamber whereby well fluid above said fish is agitated, a permanent type magnet carried on the lower end of the body in position to attract said fish, restricted passage means through the body providing for fluid flow between the lower and upper ends thereof communicating with said enclosed chamber, and an additional chamber in said body above said restricted passage means.

References Cited in the file of this patent

UNITED STATES PATENTS

| | | |
|---|---|---|
| 1,158,292 | Rigby | Oct. 26, 1915 |
| 2,139,075 | Gates | Dec. 6, 1938 |
| 2,431,361 | Athey | Nov. 25, 1947 |
| 2,449,720 | Santiago | Sept. 21, 1948 |
| 2,539,435 | Kirby | Jan. 30, 1951 |
| 2,657,752 | Ballew et al. | Nov. 3, 1953 |
| 2,668,077 | Kirby | Feb. 2, 1954 |
| 2,734,767 | Donham | Feb. 14, 1956 |